(12) United States Patent
Terwilliger et al.

(10) Patent No.: US 12,065,963 B2
(45) Date of Patent: *Aug. 20, 2024

(54) REDUCING CONTRAILS FROM AN AIRCRAFT POWERPLANT

(71) Applicant: RTX Corporation, Farmington, CT (US)

(72) Inventors: Neil J. Terwilliger, Cheshire, CT (US); Joseph B. Staubach, Colchester, CT (US); David L. Ma, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,481

(22) Filed: Apr. 24, 2023

(65) Prior Publication Data

US 2023/0279806 A1  Sep. 7, 2023

Related U.S. Application Data

(63) Continuation of application No. 17/670,090, filed on Feb. 11, 2022, now Pat. No. 11,635,022.

(51) Int. Cl.
*F02C 3/30* (2006.01)
*F02C 7/12* (2006.01)

(52) U.S. Cl.
CPC .................. *F02C 3/30* (2013.01); *F02C 7/12* (2013.01); *F05D 2220/323* (2013.01); *F05D 2240/35* (2013.01); *F05D 2260/207* (2013.01); *F05D 2260/212* (2013.01); *F05D 2260/213* (2013.01); *F05D 2260/605* (2013.01)

(58) Field of Classification Search
CPC ........ F02C 3/30; F02C 7/12; F05D 2220/323; F05D 2240/35; F05D 2260/207; F05D 2260/212; F05D 2260/213; F05D 2260/605
See application file for complete search history.

(56) References Cited

U.S. PATENT DOCUMENTS

| | | | |
|---|---|---|---|
| 3,978,661 A * | 9/1976 | Cheng | ................... F01K 21/047 60/39.5 |
| 5,014,508 A | 5/1991 | Lifka | |
| 5,052,176 A | 10/1991 | Labatut | |

(Continued)

FOREIGN PATENT DOCUMENTS

| | | |
|---|---|---|
| DE | 102018203159 B4 | 5/2021 |
| EP | 3048281 B1 | 4/2017 |

(Continued)

*Primary Examiner* — Steven M Sutherland
(74) *Attorney, Agent, or Firm* — Getz Balich LLC (57) ABSTRACT

A method is provided during which an aircraft powerplant is provided. The aircraft powerplant includes a combustor and a water recovery system. The water recovery system includes a condenser and a reservoir. Fuel is combusted within the combustor to provide combustion products. Water is extracted from the combustion products using the condenser. The water recovery system is operated in one of a plurality of modes based on likelihood of contrail formation. The modes include a first mode and a second mode, where the water is collected within the reservoir during the first mode, and where the water passes through the water recovery system during the second mode.

17 Claims, 5 Drawing Sheets

(56) References Cited

U.S. PATENT DOCUMENTS

| | | | |
|---|---|---|---|
| 5,247,791 A * | 9/1993 | Pak | F02C 3/34 |
| | | | 60/39.55 |
| 5,896,740 A | 4/1999 | Shouman | |
| 7,721,524 B2 | 5/2010 | Jahnsen | |
| 2008/0072577 A1 | 3/2008 | Taylor | |
| 2021/0001269 A1 | 1/2021 | Klingels | |
| 2021/0207500 A1 | 7/2021 | Klingels | |
| 2021/0285851 A1 | 9/2021 | Farouz-Fouquet | |

FOREIGN PATENT DOCUMENTS

| | | |
|---|---|---|
| GB | 870268 A | 6/1961 |
| GB | 2190964 A | 12/1987 |
| RU | 2561757 C1 | 9/2015 |
| WO | 2022223073 A1 | 10/2022 |

\* cited by examiner

REDUCING CONTRAILS FROM AN AIRCRAFT POWERPLANT

This application is a continuation of U.S. patent application Ser. No. 17/670,090 filed Feb. 11, 2022, which is hereby incorporated herein by reference in its entirety.

BACKGROUND OF THE DISCLOSURE

1. Technical Field

This disclosure relates generally to an aircraft powerplant and, more particularly, to combustion products exhausted from the aircraft powerplant.

2. Background Information

As government emissions standards tighten, interest in alternative fuels for gas turbine engines continues to grow. There is interest, for example, in fueling a gas turbine engine with hydrogen ($H_2$) rather than a traditional hydrocarbon fuel such as kerosine to reduce greenhouse emissions. While various hydrogen fueled gas turbine engines are known in the art, there is still room in the art for improvement. For example, additional water vapor may be exhausted from a hydrogen fueled gas turbine engine. Introduction of this water vapor into an environment outside of an aircraft may contribute to formation of a contrail downstream of the aircraft. It has been theorized that contrails may contribute to global warming. There is a need in the art therefore for systems and method which can reduce contrail formation.

SUMMARY OF THE DISCLOSURE

According to an aspect of the present disclosure, a method is provided during which an aircraft powerplant is provided. The aircraft powerplant includes a combustor and a water recovery system. The water recovery system includes a condenser and a reservoir. Fuel is combusted within the combustor to provide combustion products. Water is extracted from the combustion products using the condenser. The water recovery system is operated in one of a plurality of modes based on likelihood of contrail formation. The modes include a first mode and a second mode, where the water is collected within the reservoir during the first mode, and where the water passes through the water recovery system during the second mode.

According to another aspect of the present disclosure, another method is provided during which a powerplant is provided for an aircraft. The powerplant includes a combustor and a water recovery system. The water recovery system includes a condenser and a reservoir. Fuel is combusted within the combustor to provide combustion products. Water is extracted from the combustion products using the condenser. The water recovery system is operated in one of a plurality of modes based on ambient environmental conditions outside of the aircraft. The modes include a first mode and a second mode, where the water is collected within the reservoir during the first mode, and where the water is directed out of the water recovery system during the second mode.

According to still another aspect of the present disclosure, a powerplant is provided for an aircraft. This aircraft powerplant includes a combustor, a turbine, an exhaust, a core flowpath and a water recovery system. The turbine is fluidly coupled with and downstream of the combustor. The exhaust is fluidly coupled with and downstream of the turbine. The core flowpath extends from the combustor, through the turbine to the exhaust. The water recovery system includes a condenser and a reservoir. The condenser is arranged with the exhaust. The water recovery system is configured to extract water from combustion products flowing through the core flowpath using the condenser. The water recovery system is configured to operate in one of a plurality of modes based on likelihood of contrail formation. The modes include a first mode and a second mode. The water is collected within the reservoir during the first mode. The water passes through the water recovery system during the second mode.

The water recovery system may be operated in the first mode where the ambient environmental conditions include a first set of ambient environmental conditions. The water recovery system may be operated in the second mode where the ambient environmental conditions include a second set of ambient environmental conditions. A contrail may be more likely to form during the first set of ambient environmental conditions than during the second set of ambient environmental conditions.

The modes may also include a third mode during which some of the water is collected within the reservoir, and some of the water is passed through the water recovery system.

The water recovery system may be operated in the first mode where there is a first set of ambient environmental conditions. The water recovery system may be operated in the second mode where there is a second set of ambient environmental conditions. The likelihood of contrail formation may be greater under the first set of ambient environmental conditions than under the second set of ambient environmental conditions.

The water recovery system may be operated in the first mode when a value of a parameter indicative of the likelihood of contrail formation is equal to or greater than a threshold. The water recovery system may be operated in the second mode when the value of the parameter indicative of the likelihood of contrail formation is less than the threshold.

The method may also include determining the likelihood of contrail formation based on one or more ambient environmental conditions.

The method may also include measuring at least one of the one or more ambient environmental conditions using one or more sensors configured with an aircraft, where the aircraft includes the aircraft powerplant.

The method may also include receiving a communication with at least one of the one or more ambient environmental conditions from a source remote of an aircraft, where the aircraft includes the aircraft powerplant.

The one or more ambient environmental conditions may include any one or more or all of the following: a temperature of ambient air outside of the aircraft powerplant; a pressure of ambient air outside of the aircraft powerplant; a humidity of ambient air outside of the aircraft powerplant; an altitude of the aircraft powerplant; a windspeed outside of the aircraft powerplant; a quantity of sensed particulates outside of the aircraft powerplant; and/or a type of the sensed particulates outside of the aircraft powerplant.

The operating of the water recovery system may include operating the water recovery system in the one of the plurality of modes based on the likelihood of contrail formation and one or more other parameters.

The one or more other parameters may be or otherwise include future flight path environmental conditions.

The one or more other parameters may be or otherwise include performance of the aircraft powerplant.

The passing of the water may be or otherwise include venting the water out of the aircraft powerplant as liquid water.

The passing of the water may be or otherwise include directing the water to the combustor and/or another component of the aircraft powerplant.

The water recovery system may also include an evaporator. The water may be directed to the combustor through the evaporator to provide the water to the combustor as water vapor.

The fuel combusted within the combustor may be hydrogen fuel.

The method may also include: directing the combustion products through a turbine; and driving a compressor with the turbine to provide compressed air to the combustor.

The method may also include: directing the combustion products through a turbine; and driving a propulsor rotor with the turbine to provide thrust for propelling an aircraft comprising the aircraft powerplant.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
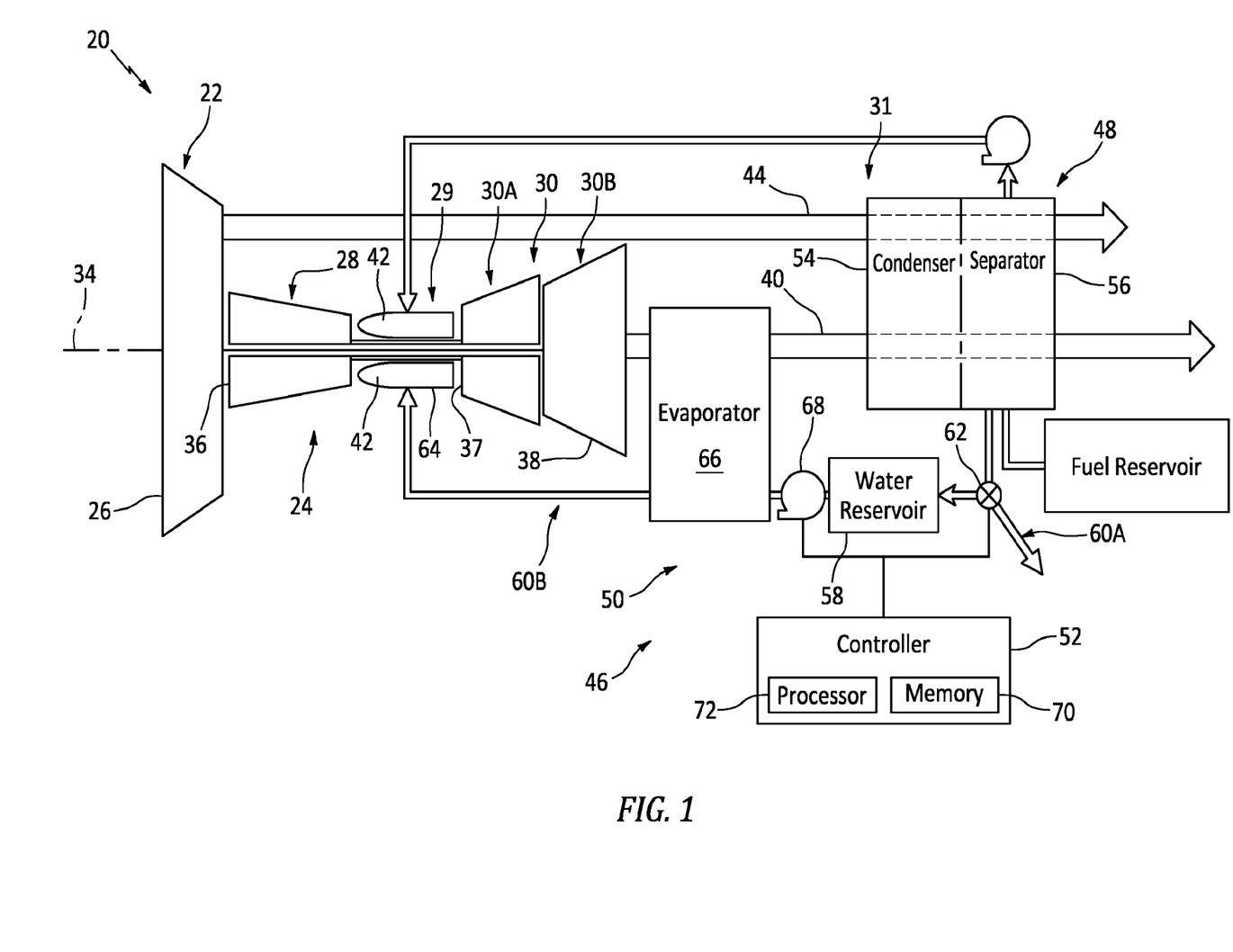
FIG. 1 is a schematic illustration of a powerplant for an aircraft.

FIG. 1 is a schematic illustration of a powerplant 20 for an aircraft such as, but not limited to, an airplane. This powerplant 20 may be configured as, or otherwise included as part of, a propulsion system for the aircraft. The powerplant 20 may also or alternatively be configured as, or otherwise included as part of, an electrical power system for the aircraft.

The powerplant 20 may be configured as a non-hydrocarbon powerplant/a hydrocarbon free powerplant; e.g., a powerplant that does not use (or require) hydrocarbon fuel for powerplant operation such as, but not limited to, kerosine, jet fuel, etc. The powerplant 20 of FIG. 1, for example, is configured as a hydrogen fueled powerplant. The present disclosure, however, is not limited to hydrogen fueled powerplants nor to non-hydrocarbon powerplants. The powerplant 20, for example, may also or alternatively be fueled using any other fuel, including hydrocarbon fuels, which produces combustion products that include water ($H_2O$) vapor.

The powerplant 20 includes a mechanical load 22 and a powerplant engine 24. The mechanical load 22 may be configured as or otherwise include at least one driven rotor 26. The mechanical load 22, for example, may be configured as a bladed propulsor rotor for the aircraft propulsion system. Examples of the propulsor rotor include, but are not limited to, a propeller for a propeller engine (e.g., a turboprop engine), a fan for a ducted fan engine (e.g., a turbofan engine), and an open rotor for an open rotor engine (e.g., a pusher fan engine, an open tractor rotor engine, etc.). The mechanical load 22 may alternatively be configured as a generator rotor in an electrical power generator for the power system. The present disclosure, however, is not limited to the foregoing exemplary mechanical loads nor the foregoing exemplary powerplant configurations.

The engine 24 may be configured as a gas turbine engine. The engine 24 of FIG. 1, for example, includes an engine compressor 28, an engine combustor 29, an engine turbine 30 and an engine exhaust 31. The turbine 30 of FIG. 1 includes a high pressure turbine 30A (HPT) and a power turbine 30B; e.g., a low pressure turbine, a free turbine, etc. The mechanical load 22, the compressor 28, the combustor 29, the high pressure turbine 30A, the power turbine 30B and the exhaust 31 of FIG. 1 are arranged sequentially along an axial centerline 34 of the powerplant 20 and its engine 24, which axial centerline 34 may also be a rotational axis for the powerplant sections.

Each of the powerplant sections 28, 30A and 30B includes a respective bladed rotor 36-38. The driven rotor 26 is connected to and rotatably driven by the power turbine rotor 38 through a low speed drivetrain; e.g., a shaft. The compressor rotor 36 is connected to and rotatably driven by the HPT rotor 37 through a high speed drivetrain; e.g., a shaft.

During powerplant operation, air is directed (e.g., through the driven rotor 26; e.g., a propulsor rotor) into a core flowpath 40. The core flowpath 40 extends sequentially through the compressor 28, the combustor 29, the high pressure turbine 30A, the power turbine 30B and the exhaust 31; e.g., an engine core. The air entering the core flowpath 40 may be referred to as core air.

The core air is compressed by the compressor rotor 36 and directed into a (e.g., annular) combustion chamber 42 of the combustor 29. Fuel (e.g., hydrogen) is injected into the combustion chamber 42 and mixed with the compressed core air to provide a fuel-air mixture. This fuel-air mixture is ignited and combustion products thereof flow through and sequentially cause the HPT rotor 37 and the power turbine rotor 38 to rotate. The combustion products are subsequently exhausted from the powerplant 20 and its engine 24 through the exhaust 31, which may provide powerplant thrust. The rotation of the HPT rotor 37 drives rotation of the compressor rotor 36 and, thus, compression of the air entering the core flowpath 40. The rotation of the power turbine rotor 38 drives rotation of the driven rotor 26. Where the driven rotor 26 is configured as the propulsor rotor, the rotation of the driven rotor 26 may propel another airflow 44 (e.g., a bypass airflow) through (e.g., internal to) and/or along (e.g., external to) the powerplant 20 and its engine 24 to provide additional powerplant thrust. Where the driven rotor 26 is configured as the generator rotor, the rotation of the driven rotor 26 may facilitate generation of electricity by the electrical power generator.

The combustion products exhausted by the powerplant 20 and its engine 24 may include relatively warm water ($H_2O$) vapor. Under certain environmental conditions (e.g., pressure, temperature, humidity, etc.), this warm water vapor may contribute to formation of a contrail in the ambient environment outside of/downstream of the powerplant 20 and, more generally, the aircraft. It has been theorized that contrails may contribute to global warming. To reduce or eliminate the formation of such contrails, the powerplant 20 of FIG. 1 includes a water recovery system 46. This water recovery system 46 is configured to recover water from the combustion products to be exhausted from the powerplant 20 and its engine 24. By reducing or eliminating the water exhausted out of the exhaust 31, the water recovery system 46 may reduce or eliminate matter which contributes to/produces contrails.

The water recovery system 46 of FIG. 1 includes a water extraction system 48 configured to extract the water from the combustion products. The water recovery system 46 includes a water processing system 50 configured to receive and collect and/or otherwise process the water extracted by the water extraction system 48. The water recovery system 46 (or the powerplant 20 more generally) also includes a controller 52 for controlling at least operation of the water recovery system 46.

The water extraction system 48 includes a condenser 54 and a water separator 56. The condenser 54 is arranged within the core flowpath 40 downstream of the power turbine 30B; e.g., within the exhaust 31. The condenser 54 is configured to condense the water vapor within the combustion products into liquid water. For example, as the combustion products flow through and/or about the condenser 54, the condenser 54 may transfer heat energy from the relatively warm combustion products into a relatively cool fluid; e.g., the bypass airflow (e.g., 44), ambient air outside of the powerplant 20, the fuel, lubricant, hydraulic fluid, etc. This transfer of the heat energy out of the combustion products cools the combustion products such that at least some (or all) of the water in the combustion products change phase from gas to liquid. Following this phase change, the separator 56 at least partially or completely separates the liquid water from the rest of the gaseous combustion products. Various types and configurations of liquid-gas separators are known in the art, and the present disclosure is not limited to any particular ones thereof.

The water processing system 50 includes a water reservoir 58 and one or more water flow circuits such as, but not limited to, a drain circuit 60A and/or an engine circuit 60B. The reservoir 58 is fluidly coupled with and downstream of the water extraction system 48 and its separator 56. The reservoir 58 is configured to contain and hold at least some or all of the water extracted from the combustion products; e.g., the water received from water extraction system 48. The reservoir 58, for example, may be configured as or otherwise include a container such as, but not limited to, a tank, a cylinder, a pressure vessel and/or a bladder.

The drain circuit 60A is fluidly coupled with and downstream of the water extraction system 48 and its separator 56. An inlet to the drain circuit 60A and an inlet to the reservoir 58, for example, may be fluidly coupled in parallel with an outlet from the water extraction system 48 through a flow regulator 62; e.g., a three way valve. The drain circuit 60A of FIG. 1 is configured to direct the water received from water extraction system 48 out of the propulsion system into the surrounding ambient environment as liquid water, which is in contrast to the water vapor otherwise included with the combustion products.

The engine circuit 60B of FIG. 1 is fluidly coupled with and downstream of the reservoir 58. An inlet to the engine circuit 60B, for example, may be fluidly coupled with an outlet from the reservoir 58. The engine circuit 60B is fluidly coupled with and upstream of the combustor 29. An outlet from the engine circuit 60B, for example, may be fluidly coupled with a (e.g., cooling) circuit inlet to the combustor 29 and/or another component of the powerplant engine 24 (e.g., an intercooler between within the compressor 28, a heat exchanger for cooling cooling air, etc.). The engine circuit 60B is configured to receive the liquid water from the reservoir 58, facilitate a phase change of at least some or all of the liquid water into water vapor, and provide the water vapor (or a mixture of water vapor and liquid water) to the combustor 29. Briefly, at the combustor 29, the water received from the engine circuit 60B may be directed into a cooling circuit in a wall 64 of the combustor 29 for cooling the combustor wall 64 and/or injected into the combustion chamber 42.

The engine circuit 60B of FIG. 1 includes an evaporator 66 and a flow regulator 68 (e.g., a pump and/or a control valve) fluidly coupled with and between the evaporator 66 and the reservoir 58. The evaporator 66 may be arranged with (e.g., along a side of and/or within) the core flowpath 40 downstream of the power turbine 30B; e.g., within the exhaust 31. The evaporator 66 is configured to vaporize at least some (or all) of the liquid water received from the reservoir 58 into water vapor. For example, as the liquid water flows through and/or about the evaporator 66, the evaporator 66 may transfer heat energy from the relatively warm combustion products into the relatively cool liquid water. This transfer of the heat energy into the liquid water heats the liquid water such at least some (or all) of the liquid water received from the reservoir 58 changes phase from liquid to gas.

The controller 52 is in signal communication (e.g., hardwired and/or wirelessly coupled) with one or more of the flow regulators 62 and/or 68. The controller 52 may be implemented with a combination of hardware and software. The hardware may include memory 70 and at least one processing device 72, which processing device 72 may include one or more single-core and/or multi-core processors. The hardware may also or alternatively include analog and/or digital circuitry other than that described above.

The memory 70 is configured to store software (e.g., program instructions) for execution by the processing device 72, which software execution may control and/or facilitate performance of one or more operations such as those described in the method below. The memory 70 may be a non-transitory computer readable medium. For example, the memory 70 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 2:
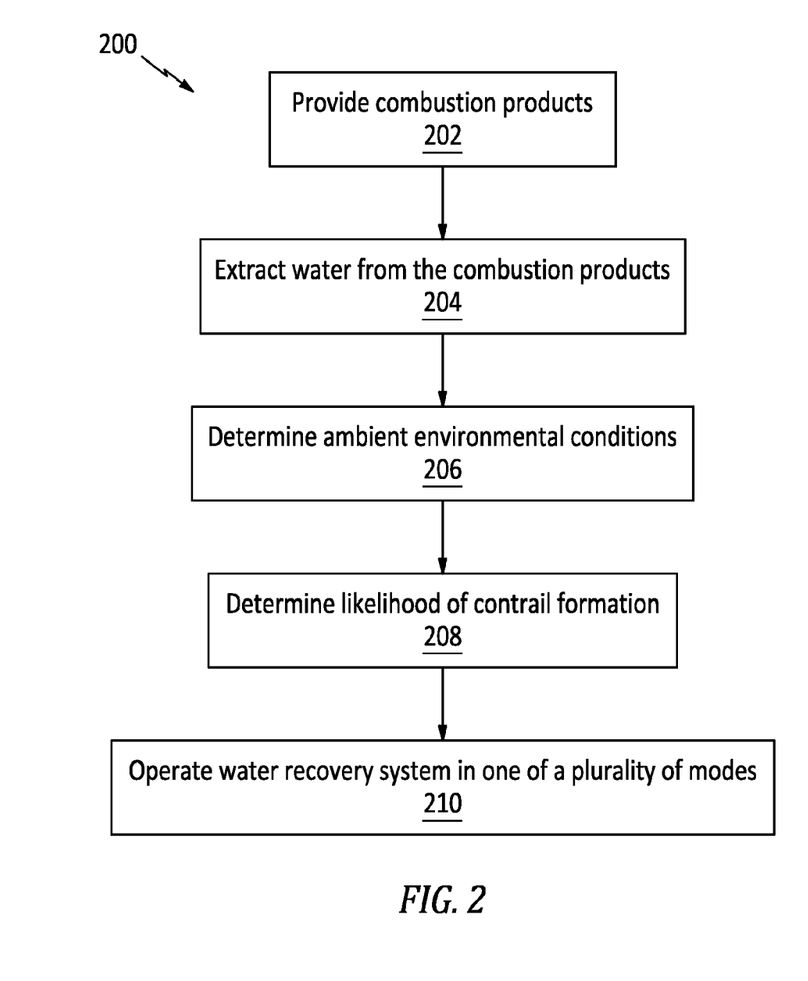
FIG. 2 is a flow diagram of a method for operating a powerplant with a water recovery system.

FIG. 2 is a flow diagram of a method for operating a powerplant with a water recovery system. For ease of description, this operating method 200 is described below with reference to the powerplant 20 and the water recovery system 46. The operating method 200 of the present disclosure, however, is not limited to such an exemplary powerplant nor water recovery system.

In step 202, the engine 24 is operated to provide the combustion products. Hydrogen and/or another fuel, for example, is injected into the combustion chamber 42 and mixed with the compressed core air (and/or another oxidizer) to provide the fuel-air mixture. This fuel-air mixture is ignited to produce the combustion products within the combustion chamber 42. These combustion products are directed within the core flowpath 40 from the combustion chamber 42, sequentially through the high pressure turbine 30A and the power turbine 30B, to the exhaust 31.

In step 204, the water is extracted from the combustion products. The water extraction system 48 and its condenser 54, for example, are operated to condense at least some or all of the water vapor in the combustion products into liquid water. At least some or all of this extracted liquid water is separated from the remaining gaseous combustion products by the separator 56 and directed to the water processing system 50.

Figure 3:
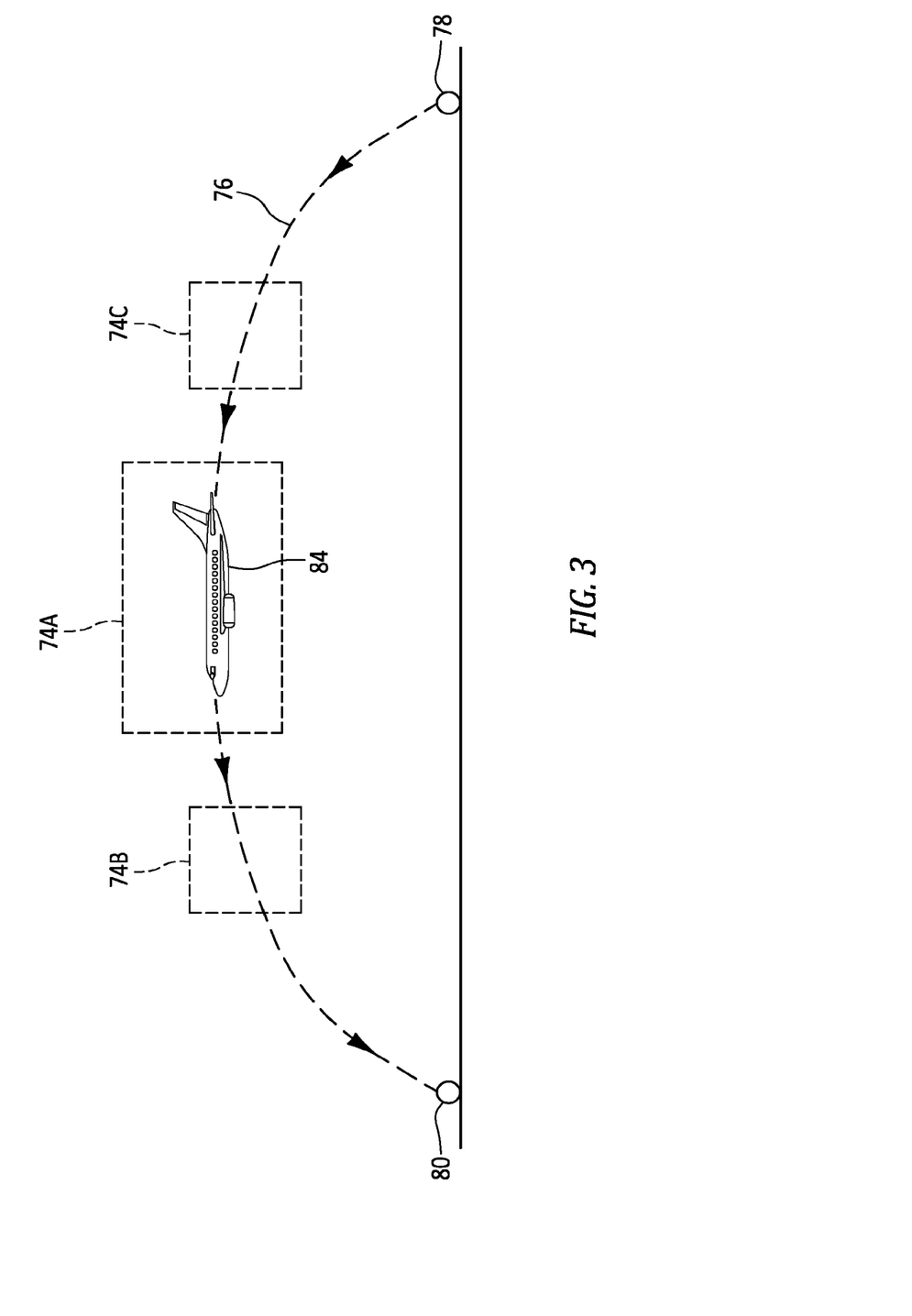
FIG. 3 is a schematic illustration of an aircraft flight path.

In step 206, one or more ambient environmental conditions are determined. Referring to FIG. 3, these ambient environmental conditions may represent ambient conditions within one or more regions 74A-C (generally referred to as 74) of an ambient environment external (e.g., outside of) the powerplant 20 and, more generally, the aircraft 84. The one or more regions of the environment may be or otherwise include a region (e.g., 74A) of the environment through which the aircraft 84 is currently flying through. The one or more regions of the environment may be or otherwise include a region (e.g., 74B) of the environment through which the aircraft 84 is on course to fly through; e.g., an environmental region in front of the aircraft. The one or more regions of the environment may be or otherwise include a region (e.g., 74C) of the environment through which the aircraft 84 already flew through; e.g., an environmental region behind the aircraft. The operating method 200 may thereby consider environmental conditions at one or more different locations (e.g., a current location, a future location and/or a past location) along a flight path 76 of the aircraft 84 between an origin 78 (e.g., takeoff location) and a destination 80 (e.g., landing location).

Figure 4:
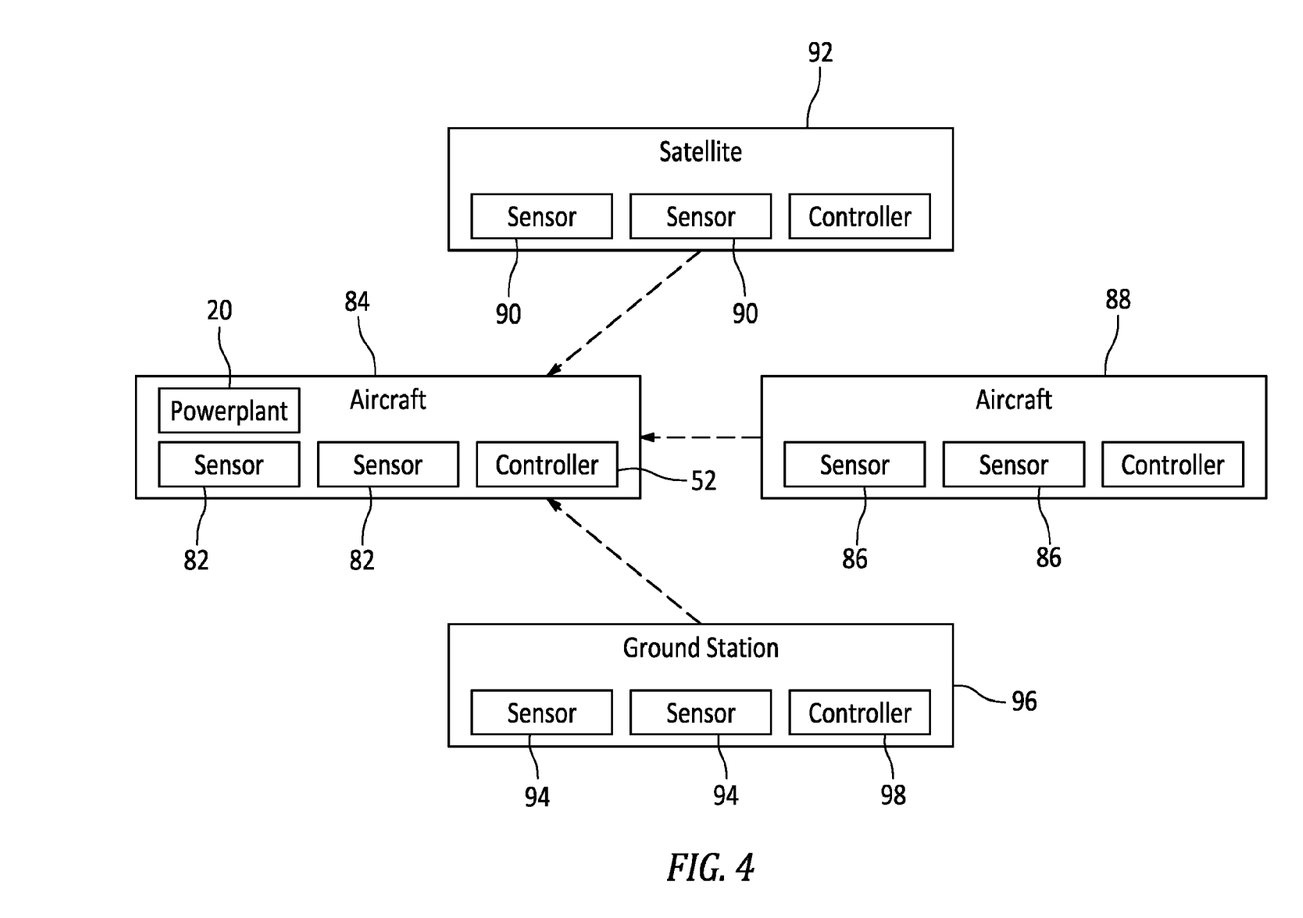
FIG. 4 is a schematic illustration of the aircraft in communication with at least one of another aircraft, a satellite and/or a ground station.

Examples of the environmental conditions include, but are not limited to, ambient pressure, ambient temperature, ambient humidity, altitude and wind speed. Referring to FIG. 4, one or more of these ambient conditions may be determined using sensor data from one or more sensors 82 arranged with the aircraft 84 which includes the powerplant 20. One or more of the ambient conditions may also or alternatively be determined using sensor data from one or more sensors arranged remote of the aircraft; e.g., sensors 86 arranged with another aircraft 88, sensors 90 arranged with a satellite 92, and/or sensors 94 arranged with a ground station 96 such as, but not limited to, a weather station. One or more of the ambient conditions may also or alternatively be determined using weather forecasting; e.g., the ambient condition(s) may be predicted based on other available information and/or trends.

In step 208, a likelihood of contrail formation is determined. More particularly, the likelihood of contrail formation within one or more regions 74 of the environment external to the powerplant 20 and, more generally, the aircraft 84 is determined. Similarly as described above with reference to FIG. 3, the one or more regions of the environment may be or otherwise include the region (e.g., 74A) of the environment through which the aircraft 84 is currently flying through. The one or more regions of the environment may be or otherwise include the region (e.g., 74B) of the environment through which the aircraft 84 is on course to fly through. The one or more regions of the environment may be or otherwise include the region (e.g., 74C) of the environment through which the aircraft 84 already flew through. The operating method 200 may thereby consider the likelihood of contrail formation at one or more different locations along the flight path 76 of the aircraft 84.

The likelihood of contrail formation may be predicted, estimated and/or otherwise determined based on at least the ambient environmental condition(s) determined during the step 206. The likelihood of contrail formation, for example, may be determined using forecasting systems based on, for example, the ambient pressure, the ambient temperature, the ambient humidity, the altitude, the wind speed, a quantity of sensed particulates within the ambient environment, and/or the type of the sensed particulates. For example, under a first set of the ambient environmental conditions (e.g., a relatively low temperature and a relatively low humidity), the likelihood of contrail formation may be relatively high. By contrast, under a second set of ambient environmental conditions (e.g., a relatively high temperature and a relatively high humidity), the likelihood of contrail formation may be relatively low. In other words, where the powerplant 20 exhausts the combustion products into the external environment without water recovery, the exhausted combustion products are more likely to form a contrail under the first set of the ambient environmental conditions than under the second set of the ambient environmental conditions.

At least a portion or an entirety (e.g., all) of the step 206 and/or the step 208 may be performed onboard the aircraft 84. The step 206 and/or the step 108, for example, may be performed by or using the controller 52. However, at least a portion or the entirety of the step 206 and/or the step 208 may be performed remote from the aircraft 84. The step 206 and/or 208, for example, may be performed by a ground controller 98 (see FIG. 4). Data including and/or otherwise indicative of the one or more ambient environmental conditions and/or the likelihood of contrail formation may subsequently be communicated (e.g., wirelessly) to the aircraft 84 and its controller 52.

In step 210, the water recovery system 46 is operated in one of a plurality of different possible modes. Which mode of operation may be selected based on, for example, one or more of the environmental conditions and/or the likelihood of contrail formation in the ambient environment outside of the powerplant 20 and, more generally, the aircraft 84. For example, where a region (or regions) of interest (e.g., of FIG. 3) within the external environment has the first set of ambient environmental conditions (e.g., the condition(s) meet or exceed respective threshold(s)), the controller 52 may operate the water recovery system 46 in a water storage mode. Where the region (or regions) of interest within the external environment has the second set of ambient environmental conditions (e.g., the condition(s) are less than respective threshold(s)), the controller 52 may operate the water recovery system 46 in a water flow mode. Where the region (or regions) of interest within the external environment has a third set of ambient environmental conditions (e.g., between the first and second sets of conditions) corresponding to an intermediate likelihood of contrail formation, the controller 52 may operate the water recovery system 46 in an intermediate mode; e.g., a quasi-water storage and/or quasi-water flow mode.

Figure 5:
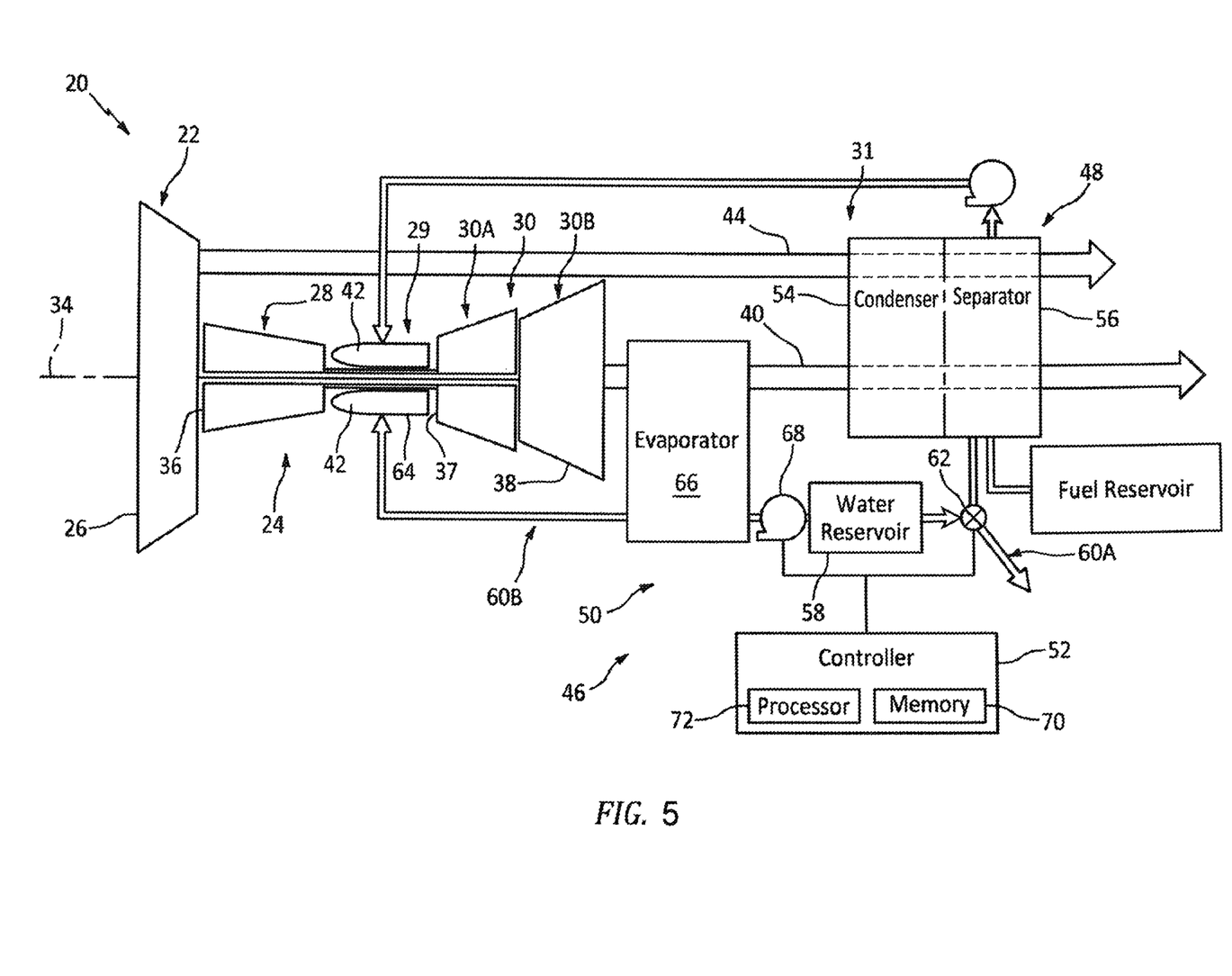
FIG. 5 is a schematic illustration of the powerplant during another mode of operation.

During the water storage mode of operation, the water recovery system 46 is operated to collect and store, for example, at least 85%, 90%, 95% or all of the water extracted from the combustion products within the exhaust 31. The controller 52, for example, may signal the flow regulators 62 and 68 to close off the water flow circuits 60A and 60B (generally referred to as 60) such that (e.g., all of) the water output from the water extraction system 48 is received by and stored within the reservoir 58. A quantity of water in the combustion products exhausted from the powerplant 20 may thereby be (e.g., significantly) reduced or eliminated, which may in turn reduce or eliminate the likelihood a contrail will form downstream of the powerplant 20 in the external environment. Of course, under certain conditions (e.g., when the reservoir 58 is close to being full or completely full of water), the controller 52 may signal one or more of the flow regulators 62 and/or 68 to flow some of the water to the drain circuit 60A and/or the engine circuit 60B; e.g., see FIG. 5.

During the water flow mode of operation, the water recovery system 46 is operated to pass at least 85%, 90%, 95% or all of the water extracted from the combustion products through the water recovery system 46. The controller 52, for example, may signal the flow regulator 62 to open flow to the drain circuit 60A and close flow to the reservoir 58. The water output from the water extraction system 48 is thereby drained into the external environment as, for example, liquid water. The controller 52 may alternatively signal the flow regulator 62 to close flow to the drain circuit 60A and open flow to the engine circuit 60B. The water output from the water extraction system 48 thereby flows through the reservoir 58 and into the engine circuit 60B via the flow regulator 68. The engine circuit 60B provides the water (e.g., in a form of water vapor) to the combustor 29, for example, for cooling the combustor 29. The controller 52 may still alternatively signal both of the flow regulators 62 and 68 to partially flow the water to the drain circuit 60A and the engine circuit 60B to pass the extracted water through the water recovery system 46 depending on, for example, engine operating conditions; e.g., a need for combustor cooling, etc. Thus, although the water may be reintroduced into the core flowpath 40 with the combustion products, the water vapor may be exhausted from the powerplant 20 and its engine 24 with little or no likelihood of contrail formation.

During the intermediate mode of operation, the water recovery system 46 is operated to (A) pass at least some (e.g., between 30% and 50%, between 40% and 60%, between 50% and 70%, etc.) of the water extracted from the combustion products through the water recovery system 46, and (B) collect and store the remainder of the water extracted from the combustion products within the reservoir 58 for later use and/or draining. The controller 52, for example, may signal the flow regulator 62 to partially open flow to the drain circuit 60A and partially open flow to the reservoir 58, but close flow to the engine circuit 60B. The water output from the water extraction system 48 is thereby directed into the drain circuit 60A for draining and directed into the reservoir 58 for storage. The controller 52 may alternatively signal the flow regulator 62 to close flow to the drain circuit 60A and open flow to the engine circuit 60B. The water output from the water extraction system 48 thereby flows into the reservoir 58 for storage, while some of that stored water may thereafter flow into the engine circuit 60B. The controller 52 may still alternatively signal both of the flow regulators 62 and 68 to partially flow the water to the drain circuit 60A and the engine circuit 60B to pass the extracted water through the water recovery system 46 depending on, for example, engine operating conditions; e.g., a need for combustor cooling, etc. Thus, although some of the water may be reintroduced into the core flowpath 40 with the combustion products, a quantity of the water vapor exhausted from the powerplant 20 and its engine 24 is reduced. Thus, even if a contrail forms, the contrail may be relatively small and, thus, less impactful on the environment than if none of the water was collected and stored within the reservoir 58.

While the water recovery system 46 may be operated based on the environmental condition(s) and/or the likelihood of contrail formation, the water recovery system 46 may also be operated based on one or more additional parameters. For example, where a relatively long length of the flight path is predicted to have a high likelihood of contrail formation, the water recovery system 46 may be operated to collect and store a majority (e.g., at least 55%, 75%, etc.) of the extracted water while flowing the remaining water through one or both of the water flow circuits 60. More particularly, the amount of water stored within the reservoir 58 may be metered such that the reservoir 58 does not fill up before leaving the region with the high likelihood of contrail formation. In another example, where a relatively short length of the flight path is predicted to have a high likelihood of contrail formation, the water recovery system 46 may be operated to collect and store all of the extracted water. In still another example, the storage or use of the extracted water may be at least partially based on local government ordinances, etc.

In some embodiments, the determination step 208 may be performed for one or more different possible modes of operating the water recovery system 46. For example, the likelihood of contrail formation may be predicted, estimated and/or otherwise determined for when: (a) all of the extracted water is collected and stored; (b) some of the extracted water is collected and stored, and some of the extracted water is drained; (c) some of the extracted water is collected and stored, and some of the extracted water is processed for use in another component of the powerplant engine 24; (d) all of the extracted water is drained; (e) all of the extracted water is processed for use in another component of the powerplant engine 24; or any other combination thereof. Aircraft powerplant performance and/or contrail reduction may be determined for some or all of these modes of operation. The powerplant performance and/or the contrail reduction may then be compared between some or all of the modes of operation to determine which mode (e.g., best) balances powerplant performance with contrail reduction. This operating mode may then be selected for performance during the step 210.

In some embodiments, the operating mode of step 210 may be selected based on future environmental conditions along the flight path 76. For example, if the aircraft 84 is currently in a first region of the environment with a low or medium likelihood of contrail formation but will later enter a second region of the environment with a high likelihood of contrail formation, the controller 52 may operate the water recovery system 46 to pass through (e.g., drain or otherwise use) at least some of the extracted water before reaching the second region. Thus, while operating in (e.g., flying through) the second region, the reservoir 58 may have enough room to store most or all of the extracted water without requiring passthrough.

The water recovery system 46 may be included in various powerplants other than the one described above. The water recovery system 46, for example, may be included in a geared powerplant where a gear train connects one or more shafts to one or more rotors. Alternatively, the water recovery system 46 may be included in a powerplant configured without a gear train. The water recovery system 46 may be included in a gas turbine engine configured with a single spool, with two spools (e.g., see FIG. 1), or with more than two spools. The gas turbine engine may be configured as a turbofan engine, a turbojet engine, a turboprop engine, a turboshaft engine, a propfan engine, a pusher fan engine or any other type of turbine engine. The gas turbine engine may alternatively be configured as an auxiliary power unit (APU). The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:
   determining likelihood of contrail formation along a region of a flight path for an aircraft, wherein the aircraft includes an aircraft powerplant with a water recovery system, and the water recovery system includes a reservoir;
   passing water through the reservoir before the aircraft reaches the region of the flight path when a parameter is greater than a threshold, the parameter indicative of the likelihood of the contrail formation along the region of the flight path.

2. The method of claim 1, wherein the water passed through the reservoir is introduced into a core flowpath of the aircraft powerplant.

3. The method of claim 1, further comprising:
   combusting fuel within the aircraft powerplant to provide combustion products;
   extracting the water from the combustion products using the water recovery system; and
   collecting the water extracted from the combustion products within the reservoir when the aircraft flies along the region of the flight path.

4. The method of claim 1, wherein the likelihood of the contrail formation along the region of the flight path is determined based on one or more environmental conditions which comprises at least one of
   a temperature of ambient air;
   a pressure of ambient air;
   a humidity of ambient air;
   an altitude of the aircraft;
   a windspeed; or
   a quantity and/or a type of sensed particulates outside of the aircraft powerplant.

5. The method of claim 4, wherein the one or more environmental conditions comprises an environmental condition within the region of the flight path.

6. A method, comprising:
   combusting fuel within a powerplant of an aircraft to provide combustion products;
   extracting water from the combustion products using a water recovery system; and
   collecting at least some of the water extracted from the combustion products within a reservoir of the water recovery system, wherein the at least some of the water is collected as the aircraft flies along a region of a flight path with a high likelihood of contrail formation, and the collection of the at least some of the water is metered based on a length of the region of the flight path.

7. The method of claim 6, wherein the collection of the at least some of the water is metered such that the reservoir is not full before the aircraft leaves the region of the flight path with the high likelihood of the contrail formation.

8. The method of claim 6, further comprising determining there is the high likelihood of the contrail formation where a parameter indicative of likelihood of the contrail formation is equal to or greater than a threshold.

9. The method of claim 6, further comprising determining there is the high likelihood of the contrail formation based on one or more environmental conditions which comprises at least one of
   a temperature of ambient air;
   a pressure of ambient air;
   a humidity of ambient air;
   an altitude of the aircraft;
   a windspeed; or
   a quantity and/or a type of sensed particulates outside of the aircraft powerplant.

10. A method, comprising:
    combusting fuel within a powerplant of an aircraft to provide combustion products;
    extracting water from the combustion products using a water recovery system;
    directing a first portion of the water extracted from the combustion products during a first mode of operation to a combustor within the powerplant as at least one of liquid water or water vapor; and
    directing a second portion of the water extracted from the combustion products during the first mode of operation out of the powerplant bypassing the combustor.

11. The method of claim 10, wherein a proportion of the first portion of the water to the second portion of the water is selected based on cooling requirements for the combustor.

12. The method of claim 10, further comprising passing the first portion of the water extracted from the combustion products through a reservoir of the water recovery system before reaching the combustor.

13. The method of claim 12, wherein the second portion of the water directed out of the powerplant bypasses the reservoir.

14. The method of claim 10, further comprising collecting all of the water extracted from the combustion products within a reservoir of the water recovery system during a second mode of operation.

15. The method of claim 14, further comprising selecting which of the first mode of operation or the second mode of operation to operate the water recovery system based on likelihood of contrail formation.

16. The method of claim 10, further comprising collecting some of the water extracted from the combustion products within a reservoir of the water recovery system during the first mode of operation.

17. A method, comprising:
    combusting fuel within a powerplant of an aircraft to provide combustion products;
    extracting water from the combustion products using a water recovery system;
    collecting the water extracted from the combustion products within a reservoir of the water recovery system; and
    draining some of the water within the reservoir from the reservoir when the water within the reservoir meets or exceeds a predetermined level;
    wherein the water drained from the reservoir is directed out of the powerplant bypassing a core flowpath of the powerplant.

* * * * *